Oct. 13, 1964  E. E. SIVACEK  3,153,139
THERMORESPONSIVE APPARATUS
Filed Dec. 17, 1959  4 Sheets-Sheet 1

INVENTOR.
Emil E. Sivacek
BY
Harness, Dickey & Pierce
ATTORNEYS.

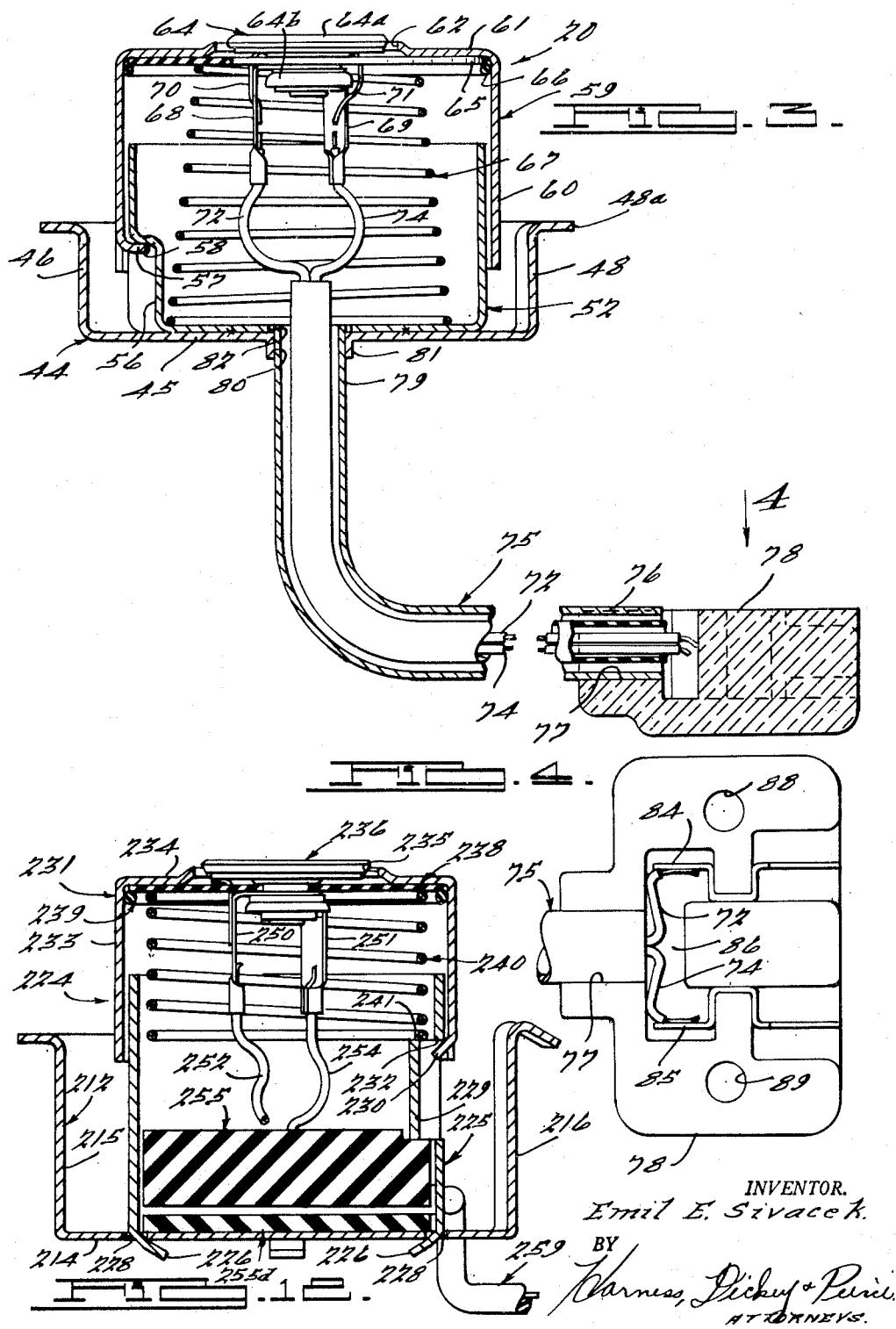

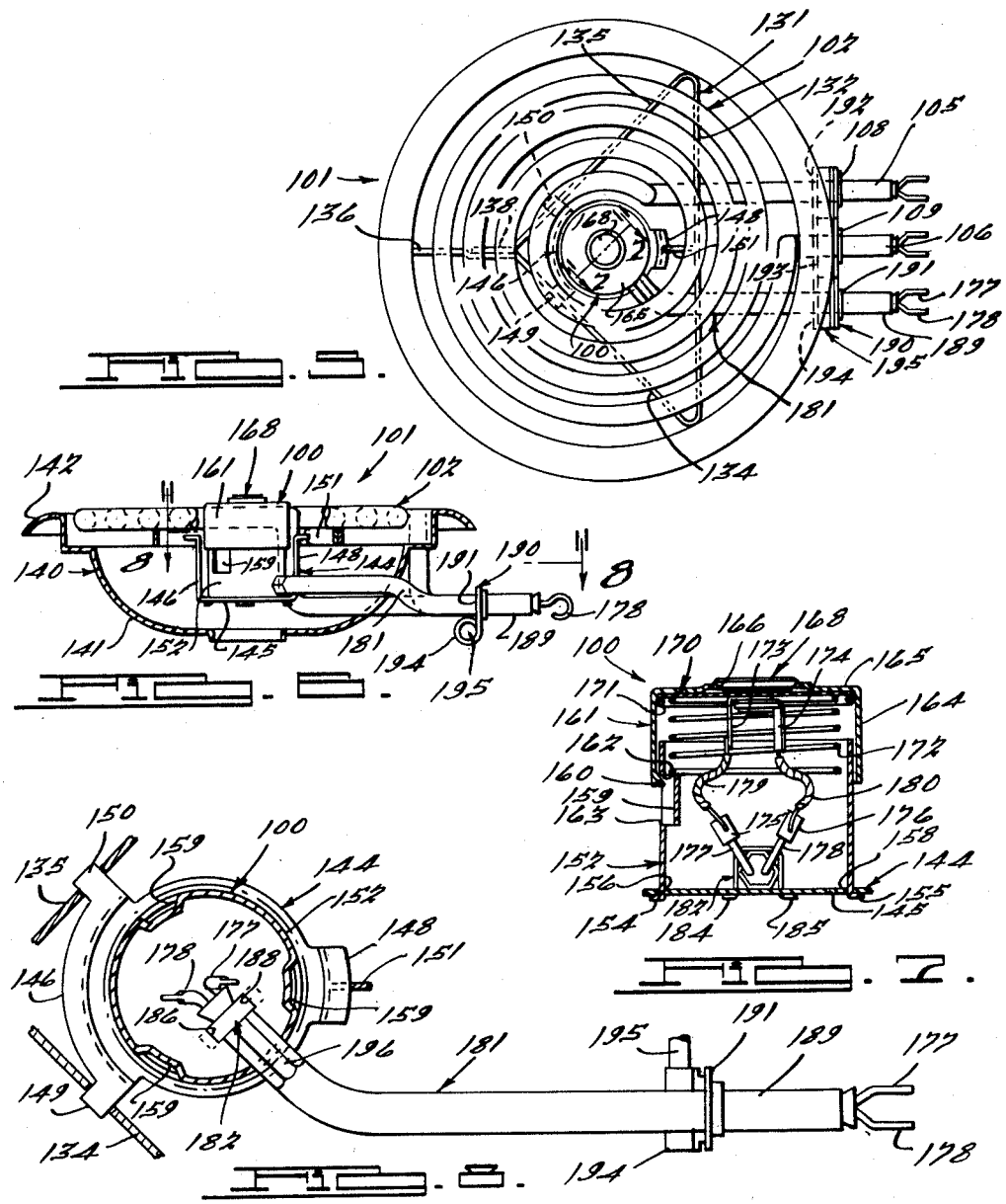

Oct. 13, 1964        E. E. SIVACEK        3,153,139
THERMORESPONSIVE APPARATUS
Filed Dec. 17, 1959        4 Sheets-Sheet 4
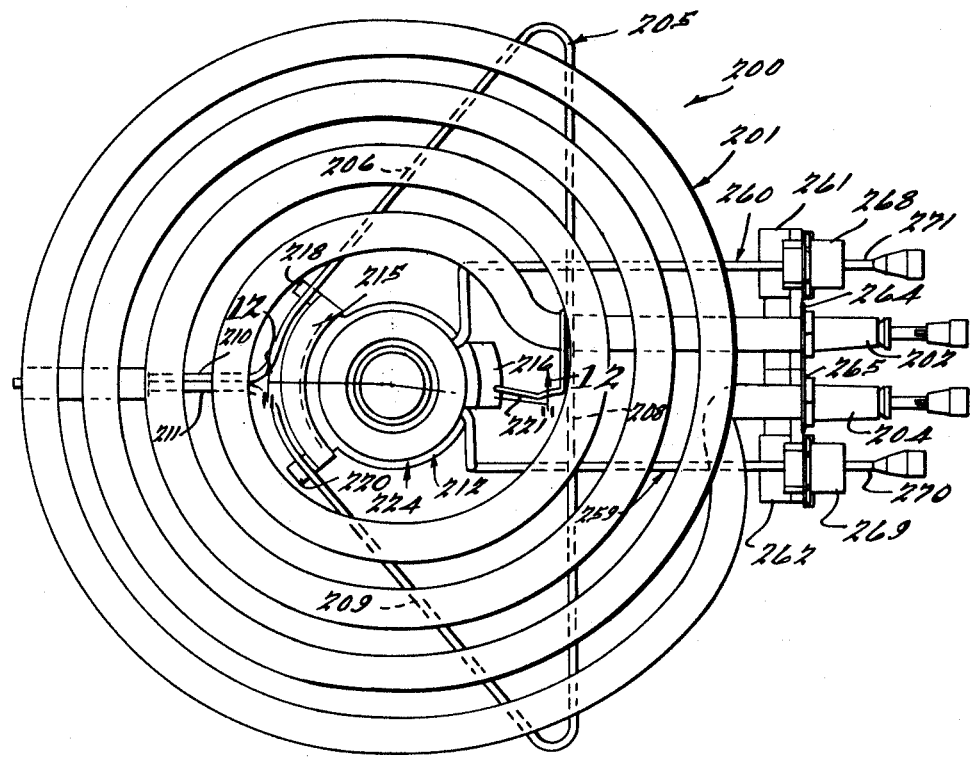
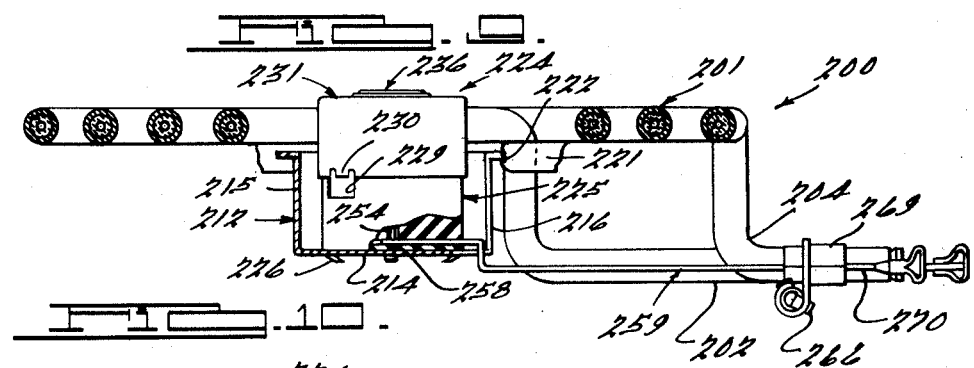
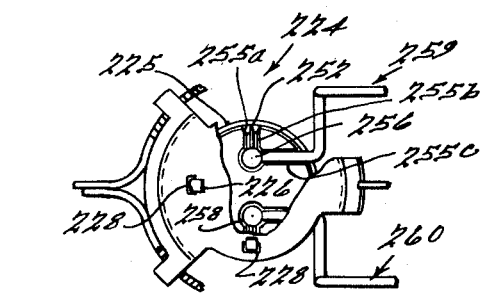
INVENTOR.
Emil E. Sivacek
BY
Harness, Dickey & Pierce
ATTORNEYS.

United States Patent Office 3,153,139
Patented Oct. 13, 1964

3,153,139
THERMORESPONSIVE APPARATUS
Emil E. Sivacek, Ann Arbor, Mich., assignor to King-Seeley Thermos Co., a corporation of Michigan
Filed Dec. 17, 1959, Ser. No. 860,280
11 Claims. (Cl. 219—450)

This invention relates generally to thermoresponsive apparatus, and more particularly to such apparatus comprising a surface heating element and a temperature sensing device arranged to sense the temperature of a pot or like object resting upon and heated by the heating element. The invention provides improved sensing devices and improved mounting relationships between the sensing devices and the associated heating elements.

It is desirable that temperature sensing devices of the type to which the present invention relates have an output characteristic that is widely variable in response to relatively smaller variations in sensed temperature. It is also desirable that the output characteristics of the devices be linearly related to variations in the temperatures sensed so as to simplify the integration thereof by related circuitry, or indicating means. Also, the thermal inertia of the sensing devices should be relatively low so that the rates of change of the output characteristics thereof are the same as the rates of change of the temperatures sensed thereby to give accurate and instantaneous indications of temperature.

In apparatus of the present type, it is also desirable that the sensing element of the sensing device bear directly against the underside of the pot or like object, and to insure this it is preferred that the sensing element be spring loaded so as to be movable relative to the heating element when the pot is placed on the heating element.

Surface heating units are inherently exposed to foreign material in the form of spilled liquids and food particles. Unless guarded against, such foreign matter often interferes with the biasing mechanism of the sensing device and so has a damaging effect on the functioning of the heat sensing device. Therefore, the sensing element is preferably substantially sealed with respect to the supporting structure therefor. Also, sealing of the sensing element with respect to its support is preferably accomplished without providing a heat conductive path between the sensing element and the supporting structure.

In accordance with the present invention, it is also desirable that the temperature sensing device and its associated heating element be interconnected in such a way that both are, as a unit, readily removable from and placed within or upon the associated range, stove or like device.

The herein disclosed arrangements achieve the above-noted desirable operating characteristics, as well as others, and, at the same time, are of simple construction, require a minimum of space and structural support and are economical of manufacture and assembly.

Accordingly, principal objects of the present invention are to provide improved sensing devices for association with surface heating elements and improved mounting relationships therebetween.

Other objects and advantages of the present invention will become apparent from a study of the following specification, wherein reference is made to the drawings, in which:

FIG. 3 is a view in vertical central section taken substantially along the line 3—3 of FIG. 1, enlarged for clarity, and showing the sensing device;

FIG. 4 is a top view of a terminal block taken in the direction of the arrow in FIG. 3;

FIG. 5 is a top plan view of a modified sensing device shown in another operative relationship with a surface heating unit;

FIG. 6 is a view partly in side elevation and partly in vertical section of the structure of FIG. 5;

FIG. 7 is a view in vertical central section taken substantially along the line 7—7 of FIG. 5;

FIG. 8 is a view in horizontal section taken substantially along the line 8—8 of FIG. 6;

FIG. 9 is a top plan view of another modified sensing device shown in operative association with a surface heating unit;

FIG. 10 is a view partly in side elevation and partly in section of the sensing device and heating unit of FIG. 9;

FIG. 11 is a fragmentary bottom view of the sensing device of FIG. 10, partially broken away to show the internal structure thereof; and FIG. 12 is a view in vertical central section taken substantially along the line 12—12 of FIG. 9, and enlarged for clarity.

Figure 1:
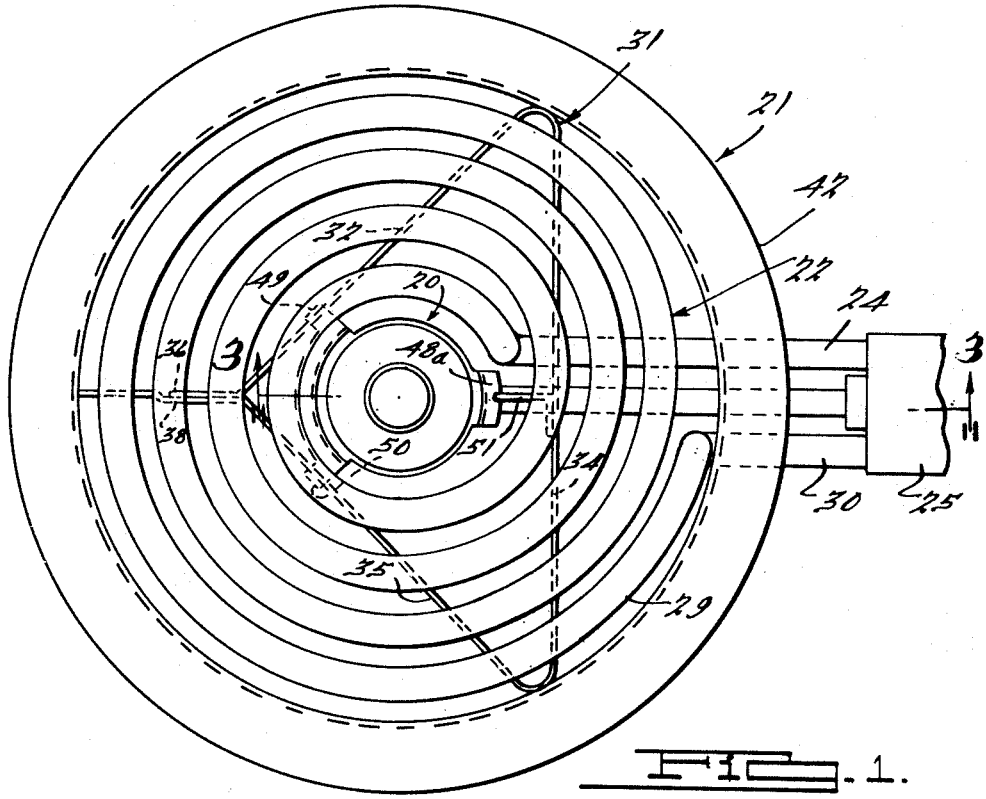
FIGURE 1 is a top plan view of a sensing device and associated surface heating unit, arranged in accordance with and embodying the present invention.

A heat sensing device in accordance with the present invention comprises an electrical resistance heat sensing element supported in a novel manner by an insulating member that is sealably disposed against an end wall of a cup-like member, the side walls of which substantially enclose a spring loading mechanism. The cup-like member overlies a tubular member in telescoping relationship so as to preclude infiltration of fluids or foreign material into the mounting enclosure. The sensing element is biased upwardly by the spring within the mounting so that the sensing element extends above a plane defined by the upper surfaces of the heating coils to provide for optimum heat transfer between the element and an article being heated. The sensing element is preferably of the type disclosed in my copending application Serial No. 604,917, filed August 20, 1956, now Patent No. 2,980,875, and assigned to the assignee of the present invention.

A heat sensing device 20, in accordance with an exemplary embodiment of the present invention, is shown operatively related with an electric surface heating unit 21. The surface heating unit 21 comprises a resistance element 22 having a terminal portion 24 supported by a suitable terminal block 25 to facilitate connection thereof to one side of a source of electrical energy (not shown). The resistance element 22 extends inwardly of the surface heating unit 21 and is wound in a plurality of concentric loops, the radius of which increases at a generally constant rate, and which lie in a common plane 26. The outermost convolution 29 of resistance element 22 has a terminal end portion 30 that is folded downwardly and radially outwardly in parallel relationship with the terminal end portion 24. The terminal end portion 30 is supported within the terminal block 25 for connection to the other side of the source of electrical energy (not shown). The terminal block 25 may be of any suitable construction.

A generally triangular supporting structure or spider 31 having angularly related legs 32, 34, and 35 is disposed beneath the resistance element 22 to support and maintain the convolutions of the element 22 in coplanar relationship, thereby to define the plane or heating surface 26. Preferably, but not necessarily, the spider 31 and unit 22 are secured together. Such securing arrangements are conventional and have not been shown. An end portion 36 of the spider 31 is secured, as by welding, to an opposite end portion 38 thereof that extends radially outwardly so as to underlie the outermost convolution 29 of the resistance element 22. Spider 31 and element 22 rest upon a cup-shaped trim member 40 having a drip pan 41 and a trim ring 42. As will be understood, trim member 40 rests upon the associated stove or range. The drip pan 41 preferably has a polished inner surface for the reflection of heat upwardly.

The sensing device 20 is supported centrally of the coiled resistance element 22 by a generally U-shaped bracket 44 having a base portion 45 and upwardly extending arcuate leg portions 46 and 48. A pair of ears 49 and 50 extend from the leg portion 46 and are received in slots provided therefor in the leg portions 32 and 35, respectively, of the spider 31. If desired, ears 49 and 50 may be twisted or otherwise bent after insertion to prevent undesired withdrawal. An L-shaped bracket 51 is secured to the leg 34 of spider 31, as by welding, and has a notch 51a in its outer end which receives the outer edge of the flange 48a of leg 48. As will be understood, in applying sensor 20 to the spider 31, ears 49 and 50 may be inserted into their slots in legs 32 and 35, at the conclusion of which movement flange 48a rests upon the top of bracket 51. By pressing down on senser 20, the legs of the spider and, in some cases, the legs 46 and 48, are caused to yield enough to let flange 48a ride down the nose of bracket 51 and snap into notch 51a. Thus, the bracket 44 is supported at three spaced points by the spider 31.

The sensing device 20 comprises a cup-shaped housing 52 that is secured to the base 45 of the bracket 44, as by welding. The housing 52 is provided with a plurality of radially inwardly depressed channels 56 (one of which is shown) that extend longitudinally of the housing 52 for the acceptance of a like plurality of tabs 57 (one of which is shown) that are engageable with an end portion 58 of the channels 56 to limit upward movement of the associated cap member 59. The tabs 57 also restrict relative rotation of the cap member 59 with respect to the housing 52. The cap member 59 overlies the housing 52 in close but free telescoping relationship and has a tubular side portion 60, the lower end whereof is engageable with the base 45 of the bracket 44 to limit downward movement of the cap member 59. The cap member 59 is of inverted cup-shaped configuration defined by the tubular side wall 60 and an end wall 61. The end wall 61 has a central aperture 62 therein for the acceptance of a circular heat sensing element 64. The sensing element 64 extends through the aperture 62 in the end wall 61 so that the upper surface thereof lies above the uppermost plane of the end wall 61. As previously stated, the sensing element is preferably of the type disclosed in my aforementioned copending application, Serial No. 604,917 now Patent No. 2,980,875.

A sealing disc 65, of insulating material, for example mica, is rigidly secured to the element 64 and is clamped between the upper and lower portions 64a and 64b of element 64. The sealing disc 65 is substantially the same diameter as the inside diameter of the tubular cap member 59. The sealing disc 65 is maintained in juxtaposed sealing relationship with the bottom surface of the end wall 61 of the cap member 59 by a spring retainer ring 66 that firmly and sealably holds the disc 65 against the end wall 61. This sealing relation of the disc 65 agianst the end wall 61 prevents liquids and foreign materials from infiltrating into the sensing device 20 and prevents the sensing element 64 from tilting with respect to the cap member 59. Also, the disc 65 presents a high impedance to heat conduction between the cap member 59 and the sensing element 64.

The cap member 59 is biased upwardly with respect to the housing 52, and the other components of the surface heating unit 21, by a helical coil spring 67 that operates in compression between the bottom side of the sealing disc 65 and the housing 52. To prevent damage of the insulating disc 65 the spacing between the bight portion 45 of the bracket 44 and the end portion of the tubular side wall 60 of the cap member 59 is such that the side wall 60 engages the bight portion 45 before the disc 65 strikes the housing 52.

A pair of downwardly extending terminals 68 and 69 on the sensing element 64 are electrically isolated from one another for connection to the terminal end portions 70 and 71 of a temperature responsive resistance wire (not shown) within the sensing element 64. A pair of insulated conductors 72 and 74 are electrically connected to the terminals 68 and 69 and to an external circuit or indicating mechanism (not shown).

A preferably rigid conduit member 75 has an end portion 76 that extends generally parallel to the terminal portions 24 and 30 of the resistance element 22 and is secured within a suitable aperture 77 in an insulating terminal member 78 which is located outside the high temperature region of the surface heating unit 21. The other end portion 79 of the conduit member 75 is bent at a right angle with respect to the end portion 76 and extends upwardly through a central aperture 80 defined by a downwardly extending terminal flange 81 in the bight portion 45 of the bracket 44 and a central aperture 82 in the bottom of the housing 52. The end portion 79 of the conduit member 75 is secured to the bracket 44, as by welding. The insulated electrical conductors 72 and 74 extend through the conduit member 75 and are connected to a pair of terminals 84 and 85, respectively, supported within suitable recesses 86 in the terminal member 78. The terminal member has a pair of spaced holes 88 and 89 to facilitate the mechanical connection thereof to the terminal block 25 on the surface heating unit 21, as by screws (not shown). Thus it will be seen that the heating element 22 and senser 21 are secured to each other through spider 31 as well as through the terminal assembly 25–78 and may be removed from and inserted in place as a unitary structure. Also, it will be noted that the conduit 75 serves as a mechanical as well as a thermal barrier to protect the leads 72–74. The sensing element 64 is threby electrically connected to the insulating terminal member 78 by means of a continuous contactless electrical conductor comprising the terminals 68 and 69 from the sensing element 64 and the conductors 72 and 74. Prior temperature sensing devices include removable terminals within the high temperature ambient zone adjacent heating means such as the electrical surface heating unit 21. Such removable terminals are corroded by the high temperature conditions. This causes resistance variances in the system which materially reduce the sensing accuracy of such assemblies after a period of use.

Referring to FIGS. 5–8, a heat sensing device 100 is shown operatively related with a surface heating unit 101 comprising a spirally wound resistance element 102. The resistance element 102 has a pair of terminal portions 105 and 106 that are supported by a pair of collars 108 and 109, respectively, as will be discussed.

As before, a generally triangular supporting structure or spider 131 having angularly related legs 132, 134, and 135 is disposed beneath the resistance element 102, and is preferably secured thereto in a conventional manner (not shown) to support and maintain the convolutions thereof in coplanar relationship. An end portion 136 of the spider 131 is secured to an opposite end portion 138 thereof, as by welding, and extends radially outwardly so as to support the outermost convolution of the resistance element 102. A cup-shaped trim member 140 comprising a drip pan 141 and a trim ring 142 supportingly underlies the heating element 102 and spider 131.

The sensing device 100 is supported centrally of the coiled resistance element 102 by a generally U-shaped bracket 144 having a base 145 and upwardly extending leg portions 146 and 148. A pair of ears 149 and 150 extend from the leg portion 146 and, as before, are engageable in slots in the leg portions 134 and 135 of the triangular supporting structure 131. An L-shaped bracket 151 is secured to the leg 132 of the trianglar support 131, as by welding, and has a notch in its outer end to receive with a snap action the outwardly extending flange at the upper end of the leg 148 of the bracket 144. Thus, the bracket 144 is supported at three spaced points by the underlying triangular support 131.

The sensing device 100 comprises a tubular housing 152 that is secured to the base 145 of the bracket 144 as by a plurality of circumferentially spaced downwardly extending tabs 154 and 155 that extend through complementary cutouts 156 and 158 in the base 145 of the bracket 144.

The housing 152 has a plurality of radially inwardly depressed channels 159 that extend longitudinally of the tubular housing 152 for the acceptance of a like plurality of radially inwardly depressed tabs 160 (one of which is shown) on a cap member 161. The cap member 161 is mounted in close but free telescoping relationship with the tubular housing 152. The tabs 160 on the cap member 161 are engageable with an end portion 162 of the channels 159 to limit upward movement of the cap member 161 with respect to the housing 152. Similarly, the tabs 160 are engageable with a lower end portion 163 of the channels 159 to limit downward movement of the cap member 161, and protect the elements carried at the upper end of the cap member from engagement with the upper end of housing 152.

The cap member 161 is of inverted cup-shaped configuration defined by a tubular side wall 164 and an end wall 165. The end wall 165 has a centrally located aperture 166 for the acceptance of a circular heat sensing element 168. The heat sensing element 168 extends through the aperture 166 so that the upper surface thereof lies above the outermost plane of the end wall 165. The sensing element 168 is preferably of the type disclosed in my aforementioned copending application Serial No. 604,917.

A sealing disc 170, of insulated material, for example mica, is rigidly secured to the element 168 in the previously described manner. The sealing disc 170 is substantially the same diameter as the inside diameter of the tubular cap member 161. The sealing disc 170 is held in close sealing relationship with the inner surface of the end wall 165 of the cap member 161 by a spring retainer ring 171. The sealing relationship of the disc 170 against the end wall 165 prevents liquids and foreign materials from infiltrating into the interior of the sensing device 100 and also prevents the sensing element 168 from moving relative to the cap member 161.

The cap member 161 is biased upwardly with respect to the housing 152, and the other components of the surface heating unit 101, by a helical coil spring 172 that operates in compression between the bottom side of the sealing disc 170 and the radially inwardly directed channels 159 in the tubular housing 152.

A pair of downwardly extending terminals 173 and 174 on the sensing element 168 are electrically isolated from one another for connection to the terminal end portions 175 and 176 of a pair of insulated conductors 177 and 178 as by a pair of conductors 179 and 180, respectively. The insulated conductors 177 and 178 provide for the electrical connection of the sensing element 168 to an external indicating mechanism (not shown).

Figure 2:
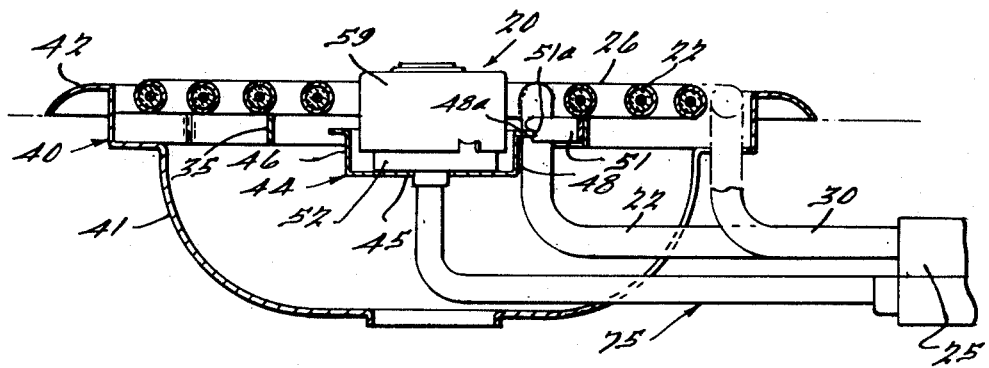
FIG. 2 is a side elevational view, partially in section, of the sensing device and heating unit of FIG. 1.

A preferably rigid conduit 181 is disposed in aligned parallel relationship with the terminal end portions 105 and 106 of the element 102. The conduit 181 is secured to the bight portion 145 of the mounting bracket 144 by a U-shaped strap 182, the end portions 184 and 185 of which extend through suitable slots 186 and 188 in the bight portion 145 of the bracket 144 and are folded or crimped thereunder to rigidly secure the conduit 181 to the mounting bracket 144. The sensing element 168, is thereby electrically connected by means of continuous contactless electrical conductors comprising the terminals 173, 174 of the sensing element 168, the terminals 175 and 176 and the insulated conductors 177 and 178. These continuous conductors terminate in removable end portions 189 which are adapted to be electrically connected to an insulating terminal member at a point located remotely of the high temperature zone adjacent the electrical resistance element 102. Such an arrangement avoids variances in the resistance of the sensing system as discussed in the embodiment illustratted in FIGURES 1 through 4.

The terminal end portions 105 and 106 of the resistance element 102 and a terminal end portion 189 of the conduit 181 are supported in spaced relationship by a spacing bracket 190 comprising the collars 108, 109, and 191, each of which has a folded portion 192, 193, and 194, respectively, for the acceptance of a transverse rod 195 that restricts relative movement of the collars 108, 109, and 191 with respect to one another. As before, accordingly the heating element 102 an senser 100 are secured together and function as a unit.

An end portion 196 of the conduit 181 is bent with respect to the terminal end portion 189 and is flattened on at least one side to facilitate engagement of the conduit 181 with the bight portion 145 of the mounting bracket 144. The flat configuration of the end portion 196 restricts any tendency for the conduit 181 to rotate with respect to the mounting bracket 144.

Referring to FIGS. 9–12, a further modified surface heating device 200 comprises a resistance element 201 wound in a planar spiral having radially outwardly extending terminal portions 202 and 204 extending in generally parallel and aligned relationship. The terminal portion 202 extends from the center of the coiled resistance element 201, and the terminal 204 extends radially outwardly from the outermost coil of the resistance element 201.

A triangular support member or spider 205 comprising angularly related legs 206, 208, and 209 underlies and is preferably secured to the resistance element 201. A pair of end portions 210 and 211 on the triangular support member 205 are joined together, as by welding, and extend radially outwardly of the resistance element 201 to support the outermost convolutions thereof.

A generally U-shaped support member 212 having a base 214 and upwardly extending leg portions 215 and 216 is secured to the spider 205 as by a pair of radially outwardly extending tabs 218 and 220 on the leg portion 215 that are engageable in slots in the leg portions 206 and 209, respectively, of the spider 205. The leg portion 216 of the support member 212 is secured to the leg portion 208 of the triangular member 205 as by an L-shaped bracket 221 that extends therebetween. The leg portion 216 is resiliently retained in a cutout portion 222 in the bracket 221 so as to be fixedly secured to the spider 205.

A sensing device 224 is supported centrally of the resistance element 201 by the U-shaped support member 212. The sensing device 224 comprises a tubular housing 225 that is secured to the base 214 of the support member 212 as by a plurality of downwardly extending tabs 226 that extend through suitable spaced apertures 228 in the base 214 and are folded radially inwardly of the sensing device 224.

The housing 225 is provided with a plurality of radially inwardly depressed chanels 229 (one of which is shown). The channels extend longitudinally of the tubular housing 225 for the acceptance of a like plurality of radially inwardly depressed tabs 230 (one of which is shown) on a cap member 231. The cap member 231 is mounted in close but free telescoping relationship with the housing 225 so as to be longitudinally reciprocable with respect thereto. The tab 230 on the cap member 231 is engageable with an upper end portion 232 of the channel 229 to limit upward movement of the cap 231 with respect to the housing 225, and is engageable with the lower end of the channel 229 to limit downward movement of the cap 231.

The cap member 231 is of inverted cup-shaped configuration defined by a tubular side wall 233 and a transverse end wall 234. The end wall 234 has a central aperture 235 therein for the acceptance of a sensing element 236. The sensing element 236 extends through the aperture 235 in the end wall 234 so that the upper surface of the element 236 lies above the uppermost plane of the end wall 234. The sensing element is preferably of the type disclosed in my aforementioned copending application Serial No. 604,917, now Patent No. 2,980,875.

A sealing disc 238, preferably of insulating material, is rigidly secured to the sensing element 236 as by staking. The sealing disc 238 is of substantialy the same diameter as the inside diameter of the tubular cap member 231. The sealing disc 238 is maintained in juxtaposed relationship with the end wall 234 of the cap member 231 by a spring retainer ring 239 that rigidly and sealably holds the sealing disc 238 against the end wall 234. As discussed hereinbefore, the sealing relation of the sealing disc 238 against the end wall 234 prevents liquid and debris from infiltrating the interior of the sensing device 224, thereby insuring that the sensing device 224 maintains its sensitivity and accurate calibration. Placement of the retainer ring 239 under the sealing disc 238 also restricts movement of the sensing element 236 with respect to the cap member 231.

The cap member 231 is biased upwardly with respect to the tubular housing 225 by a helical coil spring 240 that extends between the bottom side of the sealing disc 238 and an upper end portion 241 of the radially inwardly directed channels 229 on the tubular housing 225.

A pair of downwardly extending terminals 250 and 251 on the sensing element 236 are electrically isolated from one another and are connected to a pair of insulated conductors 252 and 254. Conductors 252 and 254, respectively, extend through vertical peripheral slots 255a and radial slots 255b in an insulating block 255. At the ends, conductors 252–254 are secured to terminals 256 and 258 on the inner ends of preferably rigid, and, as shown, uninsulated conductors 259–260. The inner ends of conductors 259–260 are laterally offset from the main body portions thereof and are received in grooves 255c on the underside of insulator 255. Conductors 259–260 are slightly larger in diameter than the depth of the grooves 255c in insulator 255, which rests upon a companion lower insulator 255d. In assembly, the two insulators 255 and 255d and the interposed conductors 259–260 are tightly clamped together since the upper surface of insulator 255 bears against the lower ends of the channels 229 and the lower insulator 255d is held solidly against the base of bracket 214 by the inturned ears or tabs 226.

The electrical conductors 259 and 260 are disposed in spaced relationship with respect to the terminal end portions 202 and 204 of the resistance element 201 and are maintained in this spaced relationship by a pair of clips 261 and 262 that are interlocked with a complementary pair of clips 264 and 265 on the terminal end portions 202 and 204 of the resistance element 201, respectively, by a member 266 that extends transversely thereof. The clips 261 and 262 are provided with insulating grommets 268 and 269, respectively, for the insulating support of the terminal end portions 270 and 271 of the electrical conductors 259 and 260, respectively. Thus, as before, the sensing device and the heating element constitute a unitary assembly. Furthermore, as was the case in the embodiments of FIGURES 1 through 4 and FIGURES 5 through 8, the sensing element 236 is electrically connected by means of continuous contactless electrical conductors defined by the downwardly extending terminals 250, 251 of the sensing element 236, the conductors 252, 254 and the terminals 256, 258 on the inner ends of the uninsulated conductors 259, 260. The outer ends of the uninsulated conductors 259, 260, defined by the terminal end portions 270, 271, are adapted to be removably connected to an external circuit or indicating mechanism by means of an insulating terminal member (not shown) into which the terminal end portions 270, 271 connect at a point spaced from the high temperature ambient zone adjacent the resistance element 201.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A temperature sensing device comprising a support member, a movable member supported by said support member and movable axially with respect thereto and having an opening in one end thereof, a temperature sensing element, electrical insulating means engaging said temperature sensing element and said movable member for retaining said temperature sensing element with respect to said movable element and centered with respect to said opening, resilient means exerting a force tending to move said movable element in one direction relative to said support element and means additional to said resilient means operatively connected to said insulating means and said movable element to immovably fix said insulating means in position with respect to said movable element.

2. A temperature sensing device comprising a tubular housing, a cap member having a transverse end wall with an aperture therein overlying said housing, a sensing element, insulating means for supporting said sensing element within said aperture, a snap ring for fixedly holding said insulating means against said cap member to prevent relative movement therebetween, and resilient means extending between said cap member and said housing for biasing said cap member away from said housing.

3. A temperature sensing device comprising a tubular housing, a tubular cap supported by and telescopically cooperating with said tubular housing having a transverse end wall, means defining an aperture in said transverse end wall, temperature sensing means, electrical insulating means engaging said temperature sensing means and disposed within said tubular cap adjacent said transverse end wall for retaining said temperature sensing means with respect to said tubular cap and centered with respect to said aperture, resilient means extending between said insulating means and said tubular housing exerting a force tending to move said tubular cap member in one direction relative to said tubular housing, and means additional to said resilient means operatively connected to said insulating means and said movable element to immovably fix said insulating means in position with respect to said tubular cap.

4. A temperature sensing device comprising a housing, a cap member having an aperture therein, a sensing element, insulating means for supporting said sensing element within said aperture, a plurality of detent means extending longitudinally of said housing, means on said cap member complementary to said detent means and disposed therein for restricting rotation of said cap member with respect to said housing, resilient means extending between said cap member and said detent means exerting a force tending to move said cap member in one direction relative to said housing, and means additional to said resilient means for immovably fixing said insulating means against said cap member in close sealing relation to prevent relative movement therebetween.

5. In a surface heating unit comprising a resistance element, a support bracket secured to and underlying said resistance element, a tubular housing secured to said supporting bracket, a cup-shaped cap member having a tubular portion and a transverse end wall with a central aperture therein, said cap member overlying said tubular housing in close telescoping relation, a sensing element, insulating means extending transversely of said cap member for supporting said sensing element within said aperture, resilient means extending between said cap member and said tubular housing exerting a force tending to move said cap member in one direction relative to said tubular housing, means additional to said resilient means for immovably fixing said insulating means against said end wall in close sealing relation to prevent relative movement therebetween, a plurality of detent means extending longitudinally of said tubular housing, a like plurality of finger means on said cap member complementary to said detent means and engageable with an end portion of said detent means for limiting movement of said cap member away from said housing, and means on said cap member engageable with said bracket to limit movement of said cap member toward said tubular housing.

6. In a surface heating unit comprising a resistance element, means for supporting said resistance element, a support bracket, a tubular housing connected to said support bracket, a cup-shaped cap member overlying said tubular housing in close telescoping relation, a sensing element supported by said cap member, resilient means extending between said cap member and said tubular housing for braking said cap member away from said tubular housing, a plurality of detent means extending longitudinally of said tubular housing, a like plurality of finger means on said cap member complementary to said detent means and engageable with an end portion of said detent means for limiting movement of said cap member away from said housing, and means on said cap member engageable with said support bracket to limit movement of said cap member toward said tubular housing.

7. A temperature sensing device comprising a tubular housing, a cup-shaped cap member having a tubular portion and a transverse end wall with a central aperture therein, said cap member overlying said tubular housing in close telescoping relation, a sensing element, insulating means extending transversely of said cap member for supporting said sensing element within said aperture, resilient means extending between said cap member and said tubular housing exerting a force tending to move said cap member in one direction relative to said tubular housing, means additional to said resilient means for immovably fixing said insulating means against said end wall in close sealing relationship therewith to prevent relative movement therebetween, a plurality of detent means extending longitudinally of said tubular housing, and a like plurality of finger means on said cap member complementary to said detent means and engageable therewith for restricting rotation of said cap member with respect to said housing.

8. In a surface heating unit comprising a resistance element, a support bracket secured to and underlying said resistance element, a tubular housing secured to said supporting bracket, a cup-shaped cap member having a tubular portion and a transverse end wall with a central aperture therein, said cap member overlying said tubular housing in close telescoping relation, a sensing element, insulating means extending transversely of said cap member for supporting said sensing element within said aperture, resilient means extending between said cap member and said tubular housing exerting a force tending to move said cap member in one direction relative to said tubular housing, means additional to said resilient means for immovably fixing said insulating means against said end wall in close sealing relation therewith and to prevent relative movement therebetween, a plurality of detent means extending longitudinally of said tubular housing, and a like plurality of finger means on said cap member complementary to said detent means and engageable with an end portion of said detent means for limiting movement of said cap member away from said housing.

9. In a surface heating unit comprising a coiled resistance element, a support bracket underlying and supported by said resistance element, a tubular housing secured to said support bracket, a cup-shaped cap member having a tubular portion and a transverse end wall with a central aperture therein, said cap member overlying said tubular housing in close telescoping relation, a sensing element, insulating means extending transversely of said cap member for supporting said sensing element within said aperture, resilient means extending between said cap member and said tubular housing exerting a force tending to move said cap member in one direction relative to said tubular housing, means additional to said resilient means for immovably fixing said insulating means against said end wall in close sealing relation to prevent relative movement therebetween, a plurality of detent means extending radially inwardly and longitudinally of said tubular housing and having upper and lower end portions, and a plurality of finger means on said cap member complementary to said detent means and disposed therein for normally engaging the upper end of said detent means to limit movement of said cap member away from said tubular housing under the bias of said resilient means and engageable with the lower end portion of said detent means to limit movement of said cap member toward said tubular housing.

10. In a surface heating unit comprising a coiled resistance element, a support bracket underlying and supported by said resistance element, a tubular housing secured to said support bracket, a cup-shaped cap member having a tubular portion and a transverse end wall with a central aperture therein, said cap member overlying said tubular housing in close telescoping relation, a sensing element, insulating means extending transversely of said cap member for supporting said sensing element within said aperture, resilient means extending between said cap member and said tubular housing exerting a force tending to move said cap member in one direction relative to said tubular housing, and means additional to said resilient means for immovably fixing said insulating means against said end wall in close sealing relation to prevent relative movement therebetween, a plurality of detent means extending radially inwardly and longitudinally of said tubular housing and having upper and lower end portions, a plurality of finger means on said cap member complementary to said detent means and disposed therein for normally engaging the upper end of said detent means to limit movement of said cap member away from said tubular housing under the bias of said resilient means and engageable with the lower end portion of said detent means to limit movement of said cap member toward said tubular housing, conduit means extending radially outwardly from said tubular housing, and a pair of electrical conductors within said conduit for electrically connecting said sensing element to electrical circuitry displaced from the heated environment sensed by said sensing element.

11. In a surface heating unit comprising a coiled resistance element, a support bracket underlying and supported by said resistance element, a tubular housing secured to said support bracket, a cup-shaped cap member having a tubular portion and a transverse end wall with a central aperture therein, said cap member overlying said tubular housing in close telescoping relation, a sensing element, insulating means extending transversely of said cap member for supporting said sensing element within said aperture, means for fixedly holding said insulating means against said end wall in close sealing relation to prevent relative movement therebetween, resilient means extending between said cap member and said tubular housing for biasing said cap member away from said tubular housing, a plurality of detent means extending radially inwardly and longitudinally of said tubular housing and having upper and lower end portions, a plurality of finger means on said cap member complementary to said detent means and disposed therein for normally engaging the upper end of said detent means to limit movement of said cap member away from said tubular housing under the bias of said resilient means and engageable with the lower end portion of said detent means to limit movement of said cap member toward said tubular housing, conduit means extending radially outwardly from said tubular housing, and a pair of electrical conductors within said conduit for electrically connecting said sensing element to electrical circuitry displaced from the heated environment sensed by said sensing element, said conduit support bracket to restrict relative rotation therebetween. means having a flat end surface for engagement with said References Cited in the file of this patent

UNITED STATES PATENTS

| | | |
|---|---|---|
| 2,727,975 | Molyneaux et al. | Dec. 20, 1955 |
| 2,806,122 | Thunander | Sept. 10, 1957 |
| 2,813,962 | Skala | Nov. 19, 1957 |
| 2,880,614 | Reiter | Apr. 7, 1959 |
| 3,017,490 | McOrlly et al. | Jan. 16, 1962 |
| 3,017,491 | Ammerman | Jan. 16, 1962 |

UNITED STATES PATENT OFFICE
CERTIFICATE OF CORRECTION

Patent No. 3,153,139

October 13, 1964

Emil E. Sivacek

It is hereby certified that error appears in the above numbered patent requiring correction and that the said Letters Patent should read as corrected below.

Column 2, line 35, after "preclude" insert -- the --; column 3, line 67, for "agianst" read -- against --; column 4, line 43, for "threby" read -- thereby --; column 5, line 49, for "The" read -- This --; column 6, line 22, for "an" read -- and --; column 9, line 26, for "braking" read -- biasing --; column 12, lines 1 and 2, for "support bracket to restrict relative rotation therebetween. means having a flat end surface for engagement with said" read -- means having a flat end surface for engagement with said support bracket to restrict relative rotation therebetween. --.

Signed and sealed this 21st day of September 1965.

(SEAL)
Attest:

ERNEST W. SWIDER
Attesting Officer

EDWARD J. BRENNER
Commissioner of Patents